(12) United States Patent
Singh et al.

(10) Patent No.: US 9,112,389 B2
(45) Date of Patent: Aug. 18, 2015

(54) MACHINE FOR GENERATING ELECTRICAL ENERGY OR SENSING MATERIAL FLOW

(71) Applicant: Deere & Company, Moline, IL (US)

(72) Inventors: Brij N. Singh, West Fargo, ND (US); Michael L. Rhodes, Richfield, MN (US)

(73) Assignee: DEERE & COMPANY, Moline, IL (US)

( * ) Notice: Subject to any disclaimer, the term of this patent is extended or adjusted under 35 U.S.C. 154(b) by 156 days.

(21) Appl. No.: 13/849,845

(22) Filed: Mar. 25, 2013

(65) Prior Publication Data
US 2014/0283491 A1    Sep. 25, 2014

(51) Int. Cl.
| | | |
|---|---|---|
| *H02P 7/00* | (2006.01) | |
| *H02P 25/30* | (2006.01) | |
| *H02K 7/18* | (2006.01) | |
| *G01F 1/115* | (2006.01) | |
| *A01D 41/127* | (2006.01) | |
| *A01D 69/02* | (2006.01) | |
| *F03G 7/00* | (2006.01) | |
| *G01D 5/00* | (2006.01) | |
| *G01F 15/00* | (2006.01) | |
| *G01F 15/06* | (2006.01) | |

(52) U.S. Cl.
CPC .......... *H02K 7/1823* (2013.01); *A01D 41/1272* (2013.01); *A01D 69/02* (2013.01); *F03G 7/00* (2013.01); *G01D 5/00* (2013.01); *G01F 1/115* (2013.01); *G01F 15/00* (2013.01); *G01F 15/068* (2013.01)

(58) Field of Classification Search
USPC ....... 318/149, 150; 290/52–55, 1 A; 415/229; 460/6
See application file for complete search history.

(56) References Cited

U.S. PATENT DOCUMENTS

| | | | | |
|---|---|---|---|---|
| 6,011,334 A * | 1/2000 | Roland | ............................ | 310/86 |
| 6,208,061 B1 * | 3/2001 | An | .............................. | 310/254.1 |
| 7,605,486 B2 * | 10/2009 | Bridwell | .......................... | 290/43 |
| 7,633,174 B1 * | 12/2009 | Feiler | ............................... | 290/43 |
| 7,868,476 B2 * | 1/2011 | Baca et al. | ........................ | 290/55 |
| 8,032,255 B2 * | 10/2011 | Phelan et al. | .................. | 700/281 |
| 8,067,852 B2 * | 11/2011 | Ortiz et al. | ...................... | 290/55 |
| 8,148,839 B2 * | 4/2012 | Rosefsky | .......................... | 290/52 |
| 8,604,632 B2 * | 12/2013 | Hardin et al. | .................... | 290/43 |
| 2002/0180216 A1 * | 12/2002 | McDavid, Jr. | ................... | 290/54 |
| 2003/0034697 A1 * | 2/2003 | Goldner et al. | ................. | 310/17 |
| 2003/0062724 A1 * | 4/2003 | Gondron | ........................ | 290/1 R |
| 2003/0111844 A1 * | 6/2003 | McDavid, Jr. | ................... | 290/55 |
| 2004/0027020 A1 * | 2/2004 | Newcomb | ................. | 310/156.01 |
| 2005/0285407 A1 * | 12/2005 | Davis et al. | ...................... | 290/54 |
| 2007/0018459 A1 * | 1/2007 | Williams | .......................... | 290/54 |
| 2007/0018460 A1 * | 1/2007 | Williams | .......................... | 290/54 |
| 2007/0216245 A1 * | 9/2007 | Fielder | ........................ | 310/102 R |
| 2008/0238105 A1 * | 10/2008 | Ortiz et al. | ...................... | 290/54 |
| 2008/0284174 A1 * | 11/2008 | Nagler | ............................. | 290/54 |
| 2009/0058093 A1 * | 3/2009 | Bridwell | .......................... | 290/54 |
| 2009/0066087 A1 * | 3/2009 | Van Huffel | ..................... | 290/54 |
| 2009/0315329 A1 * | 12/2009 | Duffey et al. | ................... | 290/44 |
| 2009/0325658 A1 * | 12/2009 | Phelan et al. | .................... | 460/6 |

(Continued)

*Primary Examiner* — Paul Ip

(57) ABSTRACT

In accordance with one embodiment, a machine for generating electrical energy comprises a housing. A rotor has interior blades for rotation in response to receipt of material. The rotor has an outer surface and an inlet. A first magnet assembly is secured to the outer surface of the rotor. A first stator winding is in electromagnetic communication with the corresponding first magnetic assembly, such that if the rotor rotates a first electromagnetic signal energizes the first stator windings based on the flow of material into or through the inlet.

31 Claims, 5 Drawing Sheets

(56) References Cited

U.S. PATENT DOCUMENTS

| | | | |
|---|---|---|---|
| 2010/0001529 A1* | 1/2010 | Rosefsky | 290/52 |
| 2010/0032953 A1* | 2/2010 | Bridwell | 290/54 |
| 2010/0047079 A1* | 2/2010 | Reinschke | 417/44.1 |
| 2010/0109329 A1* | 5/2010 | Brantingham | 290/53 |
| 2010/0133839 A1* | 6/2010 | Bridwell | 290/52 |
| 2010/0133853 A1* | 6/2010 | Masi et al. | 290/55 |
| 2010/0207388 A1* | 8/2010 | Nyffenegger | 290/43 |
| 2010/0207389 A1* | 8/2010 | Nyffenegger | 290/44 |
| 2010/0230973 A1* | 9/2010 | Ortiz et al. | 290/55 |
| 2011/0084494 A1* | 4/2011 | Andujar | 290/55 |
| 2011/0285134 A1* | 11/2011 | Ortiz et al. | 290/52 |
| 2011/0285135 A1* | 11/2011 | Ortiz et al. | 290/52 |
| 2012/0007364 A1* | 1/2012 | David | 290/54 |
| 2012/0086293 A1* | 4/2012 | Casas | 310/80 |
| 2012/0175881 A1* | 7/2012 | Rosefsky | 290/54 |
| 2012/0175885 A1* | 7/2012 | Peer | 290/1 A |
| 2013/0230380 A1* | 9/2013 | Allouche et al. | 415/1 |

\* cited by examiner

MACHINE FOR GENERATING ELECTRICAL ENERGY OR SENSING MATERIAL FLOW

FIELD OF THE INVENTION

This disclosure relates to a machine for generating electrical energy or sensing material flow, such as a machine that is capable of generating electrical energy from the motion of harvested material.

BACKGROUND

A harvester (e.g., combine) harvests crops, plants, or other materials to yield harvested material. In some prior art, the harvested material is discharged from a chute of a harvester (e.g., combine) to transfer the harvested material to a storage container, cart, or other place. Various sensors or other electrical loads on the harvester require electrical energy for operation. Thus, there is a need or opportunity to provide a machine for generating electrical energy from the motion of harvested material.

SUMMARY OF THE INVENTION

In accordance with one embodiment, a machine for generating electrical energy comprises a housing. A rotor has interior blades for rotation in response to receipt of material. The rotor has an outer surface and an inlet. A first magnet assembly is secured to the outer surface of the rotor. A first stator winding is in electromagnetic communication with the corresponding first magnet assembly, such that if the rotor rotates a first electromagnetic signal energizes the first stator windings based on the flow of material into or through the inlet. The first electromagnetic signal can be used as an indicator of the flow the material or as a source of electrical energy.

DESCRIPTION OF THE PREFERRED EMBODIMENT

Figure 1:
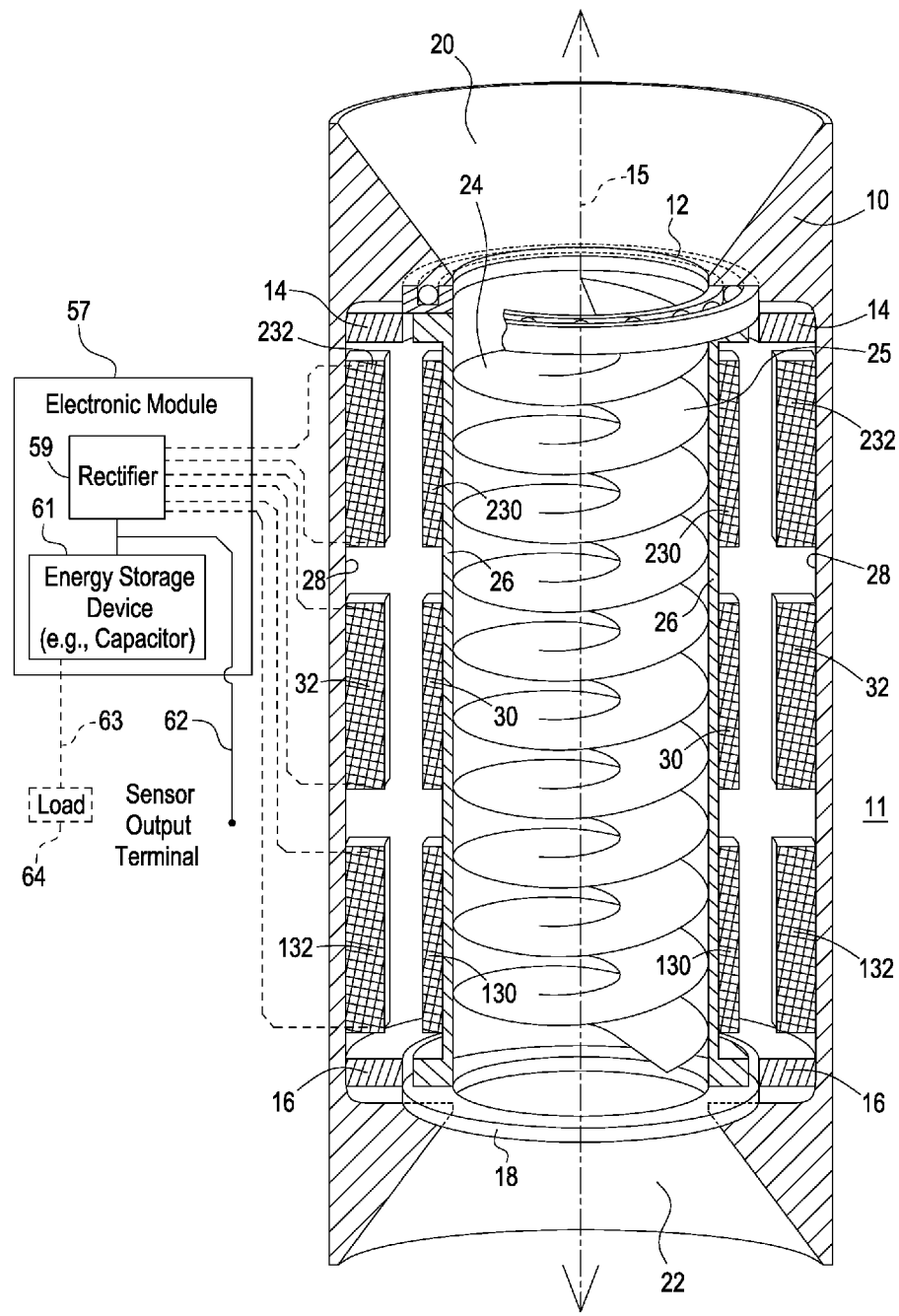
FIG. 1 is a cross section of a first embodiment of a machine for generating electrical energy or sensing material flow in accordance with the disclosure.

In accordance with one embodiment, FIG. 1 illustrates an alternator, generator or a machine 11 for generating electrical energy. The machine 11 comprises a housing 10. The housing 10 includes housing wall 28, for instance. The rotor 24 has an outer surface 26 and an inlet 20 that is located radially inward from the outer surface 26. A rotor 24 has interior blades 25 for rotation in response to receipt of material from an inlet 20. In conjunction with rotation of the rotor 24, the material is expelled from an outlet 22. A first magnet assembly 30 is secured to the outer surface 26 of the rotor 24. A first stator winding 32 is in electromagnetic communication with the corresponding first magnetic assembly, such that if the rotor 24 rotates a first electromagnetic signal energizes the first stator windings 32 based on the flow of material through and about the inlet 20. The first stator winding 32 is radially spaced, outwardly from the first magnet assembly 30 (e.g., generally concentrically about axis 15.) The first electromagnetic signal can be used as an indicator of the flow the material or as a source of electrical energy.

A rotor 24 has blades or interior blades 25 for rotation about the axis 15 in response to receipt of material from the inlet 20. In a first example, the interior blades 25 are arranged in a substantially spiral or generally helical pattern about a central rotational axis 15. In a second example, the interior blades 25 are arranged as an auger with a central cylindrical member 55.

The rotor 24 is rotatable about an axis 15 with respect to the housing 10. One or more axial bearings (12, 18) and one or more radial bearings (14, 16) interface with the housing 10 to support the rotor 24 and to allow rotation of the rotor 24 with respect to the housing 10. In one embodiment, a first axial bearing 12 is located near one end of the rotor 24, whereas a second axial bearing 18 is located at an opposite end of the rotor 24. Similarly, a first radial bearing 14 is located near one end of the rotor 24, while a second radial bearing 16 is located near an opposite end of the rotor 24. Although two axial bearings and two radial bearings are illustrated in the embodiment of FIG. 1, other configurations are possible that use fewer bearings, such as a single radial bearing that is centrally mounted in the housing 10.

In one configuration an electronic module 57 is associated with the machine 11 or connected to one or more stator windings (32, 132, 232). The electronic module 57 comprises a rectifier 59 coupled to an energy storage device 61. In turn, the energy storage device 61 may be coupled to an optional load 64 via output terminal 63. The load 64 may comprise one or more of the following: a camera, an imaging device, a sensor, a battery, an energy storage device, an electronic module, or the like. The optional load 64 shown in dashed lines to indicate that it is optional and may be deleted.

In one configuration, the mechanical motion and axial alignment of the rotor 24 can be controlled by the stator excitation, or deciding which stator windings (32, 132, 232) are active or inactive. Active stator windings are attached to a load and generate back-electromotive force on the rotor, for example.

Sensor output terminal 62 is associated with a direct current signal output of rectifier 59 or is associated with the alternating current signal output from one or more windings (32, 132, 232). The presence of generated electrical energy at the sensor output terminal provides an indicating signal that indicates the rotor 24 is rotating or that material is flowing from the inlet to the outlet of the machine 11. In an alternate configuration, if a half-wave rectifier is used, or if no rectifier is used, or a connection is directly from one or more windings (32, 132, 232), the sensor output terminal (e.g., 62) can output a trapezoidal-shaped waveform that can be used to sense rotational position of the rotor 24 via the amplitude, period, or frequency of the waveform. Accordingly, the machine 11 may be used as flow meter. Measurements of angular speed, axial displacement, or both of the rotor (e.g., 24, 124, 224, 324) can be used to estimate the flow rate in terms of mass and volume of harvested material.

In one embodiment, a rectifier 59 is coupled to the first stator windings 32 for converting the electromagnetic signal into a direct current signal. An energy storage device 61 is arranged for storing the direct current signal. The rectifier 59 comprises a bridge rectifier, a full-wave rectifier, a half-wave rectifier, or a circuit of one or more diodes. A half-wave rectifier comprises a diode that is placed in series with one of the terminals from the first stator windings 32 such that a positive or negative portion (e.g., positive sine wave portion) of the electromagnetic signal can be provided to a optional load 64 (e.g., battery), for example.

In one configuration, the energy storage device 61 comprises one or more of the following: a capacitor, an electrolytic capacitor, a low pass filter that rejects electromagnetic signals in a band above direct current or zero Hertz, a tuned network of capacitors and inductors. In an alternate embodiment, the energy storage device 61 comprises a battery or a dry-cell.

The direct current signal at an output terminal 62 of the rectifier 59 has a voltage or current that is indicative of a rate of flow of material through the inlet 20. The electronic module 57 may have one or more output terminals 63 that can be connected to an electrical optional load 64 to provide electrical energy (e.g., direct current or alternating current) to the optional load 64. Alternately, the electronic module 57 may have an output terminal associated with the rectifier output that provides a direct current voltage that is proportional to the flow of material through the machine 11. As such, the machine 11 becomes or is configured as a rotation sensor, a rotational speed or velocity sensor, or both.

As illustrated, the machine 11 of FIG. 1 has multiple magnet assemblies and multiple corresponding stator windings. In one embodiment, a first magnet assembly 30, a second magnet assembly 130, and a third magnet assembly 230 are secured to the outer surface 26 of the rotor 24. Each magnetic assembly (30, 130, or 230) is spaced apart axially from any adjacent magnet assembly or assemblies. Similarly, first stator windings 32, second stator windings 132 and third stator windings 232 are secured to the housing 10. Each stator winding (32, 132, or 232) is spaced apart axially from any adjacent stator windings. Each magnet assembly (30, 130, 230) and corresponding stator winding (32, 132, 232) are arranged in pairs or sets that are opposite each other and that are radially aligned. For example, each magnetic assembly and corresponding stator winding are separated by an air gap or clearance.

The magnet assemblies and stator windings function as follows. A first stator winding 32 is in electromagnetic communication with the corresponding first magnet assembly 30, such that if the rotor 24 rotates a first electromagnetic signal energizes the first stator windings 32 based on the flow of material through and about the inlet 20. A second stator winding 132 is in electromagnetic communication with the corresponding second magnet 130 assembly, such that if the rotor 24 rotates a second electromagnetic signal energizes the second stator windings 132 based on the flow of material through and about the inlet 20. A third stator winding 232 is in electromagnetic communication with the corresponding third magnet assembly 230, such that if the rotor 24 rotates a third electromagnetic signal energizes the third stator windings 232 based on the flow of material through and about the inlet 20. The first electromagnetic signal, second electromagnetic signal, or third electromagnetic signal, individually or collectively, can be used as one or more indicators of the flow the material (in a sensing mode of the machine 11) or as one or more sources of electrical energy (in a power-generating mode of the machine 11).

The machine 11 may be installed on a combine, harvester or a heavy-equipment vehicle, for example. If the machine 11 is installed on a combine, the inlet 20 is coupled or connected to a chute of a harvester or combine. Further, the outlet 22 of the machine 11 can be coupled or connected to the chute of the harvester or the combine. The material comprises an agricultural material selected from the group consisting of corn, grain, soybeans, oilseed, wheat, and barley. In certain illustrative embodiments, the machine 11 may comprise a micro-machine where mechanical components are compact and miniaturized to be compatible with the size and dimensions of a chute or spout of a harvester or combine.

Figure 2:
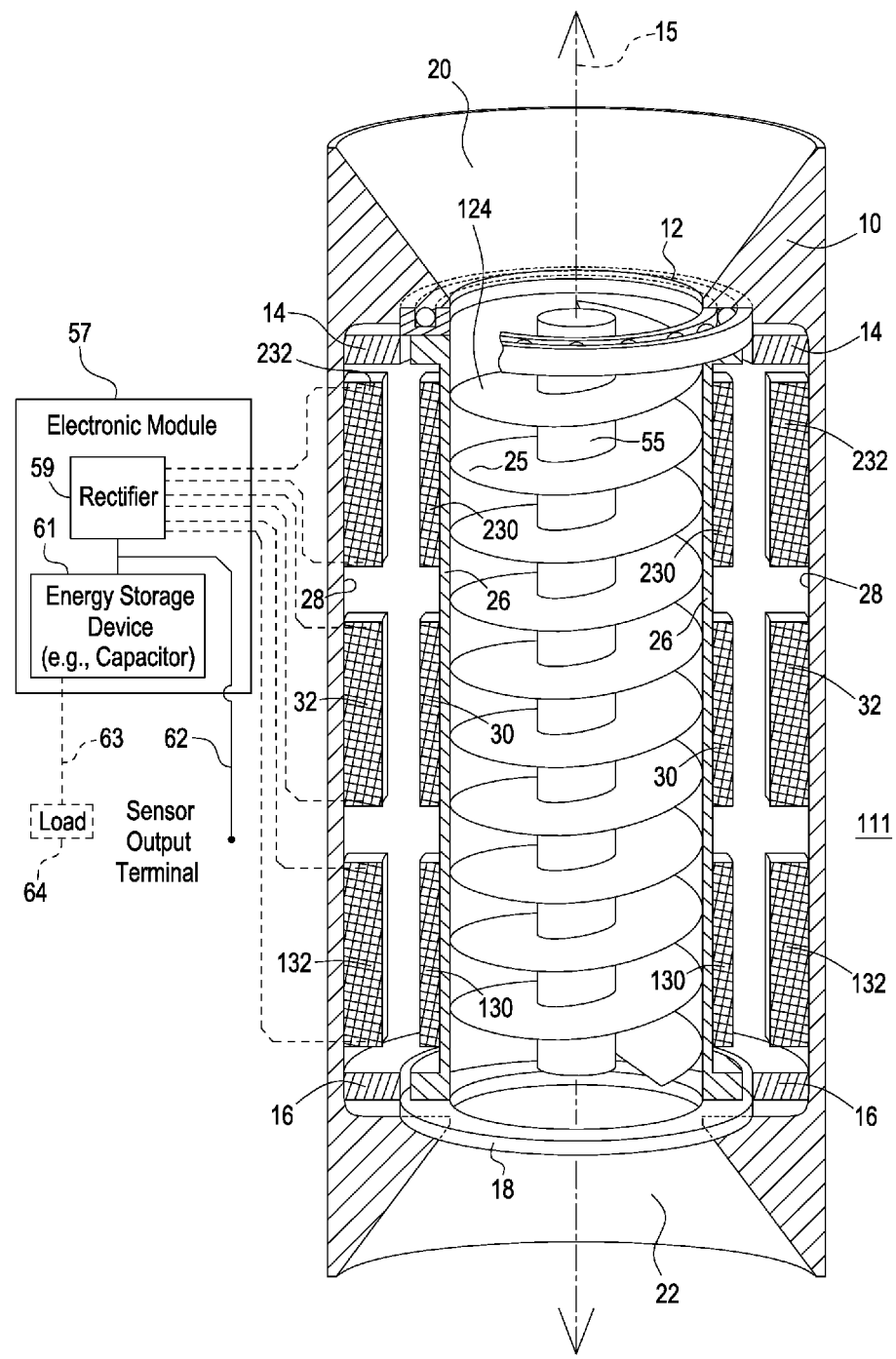
FIG. 2 is a cross section of a second embodiment of a machine for generating electrical energy or sensing material flow in accordance with the disclosure.

The machine 111 of FIG. 2 is similar to the machine 11 of FIG. 1, except the rotor 124 of FIG. 2 has a central cylindrical member 55 aligned with the central rotational axis 15 of the rotor 124. Like reference numbers in FIG. 1 and FIG. 2 indicate like elements. In one configuration, the central cylindrical member 55 can add additional support or rigidity to the blades 25. In another configuration, central cylindrical member 55 can prevent some material from flowing unimpeded through a central region of the rotor 124 without pressing against the rotor blades 25 to impress or affect rotational movement of the rotor 124.

Figure 3:
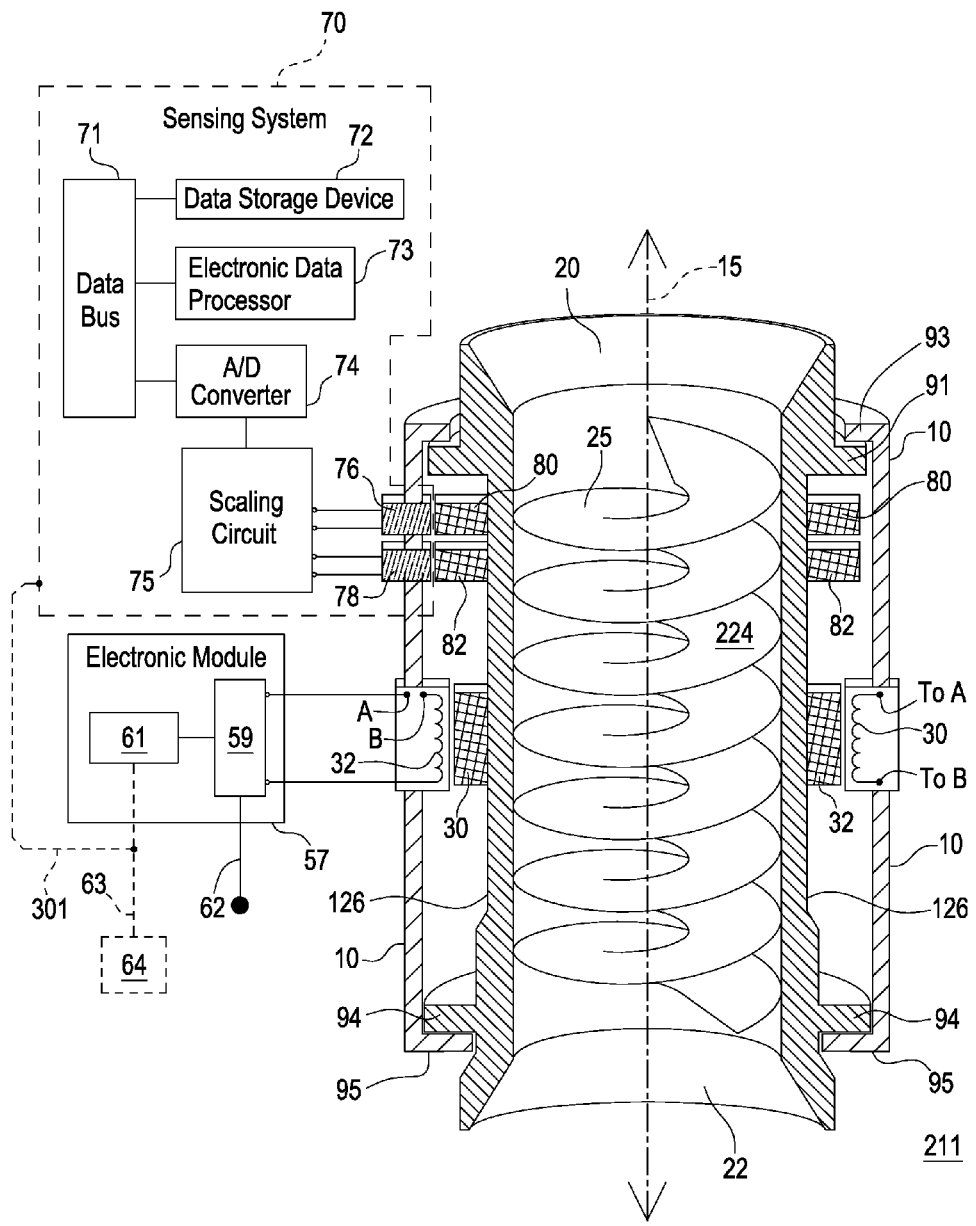
FIG. 3 is a cross section of a third embodiment of a machine for generating electrical energy or sensing material flow in accordance with the disclosure.

The machine 211 of FIG. 3 is similar to the machine 11 of FIG. 1, except two sets of magnet assemblies (130, 230) and corresponding stator windings (132, 232) are deleted, the bearings (12, 14, 16, 18) are optional or deleted, and magnetic field sensors (76, 78) and sensing system 70 are added. Like reference numbers in FIG. 1 and FIG. 3 indicate like elements.

In FIG. 3, the bearings are replaced by the first step 91 and second step 94 in the rotor 224 that extend radially outward from the outer surface 126 or generally cylindrical region of the rotor 224. The first step 91 interacts with corresponding first end 93 of the housing 10, whereas the second step 94 interacts with corresponding second end 95 of the housing 10. The first end 93 and the second end 95 extend radially inward from a housing 10, which may be generally cylindrical, as illustrated.

The sensing system 70 of FIG. 3, the first magnetic field sensor 76, or the second magnetic field sensor 78, or all of the foregoing items, may be powered by electrical energy generated by the machine 211 via the electric module 57. Accordingly, the sensing system 70 comprises a self-powering sensor for detecting material flow that is activated upon flow of material through the machine 211 via the inlet 20 and outlet 22. As shown in FIG. 3, a dashed line 301 represents an optional conductor or electrical connection from output terminal 63 to the sensing system 70 to provide electrical energy for the sensing system 70 and one or more magnetic field sensors (76, 78). Advantageously, in certain embodiments no separate electrical energy source, or only nominal supplemental electrical energy, is required to supply the sensing system 70, the sensors (76, 78), or both with adequate electrical energy or power.

In accordance with the embodiment of FIG. 3, the machine 211 comprises a primary magnet 80 secured to the outer surface 26 of the rotor 24. A secondary magnet 82 is secured to the outer surface 126 of the rotor 24 and axially spaced apart from the primary magnet. A first magnetic field sensor 76 is arranged for sensing an observed axial linear position (versus time) of the rotor 24 by detection or non-detection of a first magnetic field associated with the primary magnet 80. A second magnetic field sensor 78 is arranged for sensing an observed axial linear position (versus time) of the rotor 24 by detection of non-detection of a second magnetic field associated with the secondary magnet 82. The first magnetic field sensor 76 and second magnetic field sensor 78 facilitate the detection of axial linear motion of the rotor 24.

Each of the first magnetic field sensor 76 and the second magnetic field sensor 78 may comprise Hall Effect sensor, for example. In practice, more than two magnetic field effect sensors and more magnets than the primary magnet and the secondary magnet may be used to provide readings at all different rotational positions of the rotor 224 with respect to the housing 10.

A sensing system 70 is coupled to the terminals of the first magnetic field sensor 76 and the terminals of the second magnetic field sensor 78. The sensing system 70 may comprise, a scaling circuit 75, an analog-to-digital converter 74, an electronic data processor 73, and a data storage device 72, and a data bus 71. The data processor 73, the data storage device 72 and the analog-to-digital converter 74 may communicate with each other via the data bus 71.

In one embodiment of the sensing system 70, the optional scaling circuit 75 may scale the input voltage levels of the first signal and second signal via operational amplifiers, resistive dividing networks, or another circuit such that the output voltage level falls within a suitable range for the analog-to-digital converter 74. The analog-to-digital converter 74 converts the first signal and second signals into digital signals. The electronic data processor 73 comprises any microcontroller, microprocessor, digital logic device, programmable logic array, application specific integrated circuit, digital signal processor, Boolean logic circuit, arithmetic logic unit, or another device for data processing. The data storage device 72 may comprise electronic memory, random access memory, non-volatile random access memory, a magnetic storage device, an optical storage device, a magnetic disk drive, an optical disk drive, or the like.

The electronic data processor 73 estimates an output voltage level of the machine (211 or 311) based on processing of the digital signals. For example, the data processor 73 estimates the output voltage level as a peak output voltage level, where both the first signal and the second signals indicate the presence or detection of the magnetic fields, or the first axial alignment of the primary magnet 80 and first magnetic field sensor 76 and second axial alignment of the secondary magnet 82 and secondary magnetic field sensor 78. Conversely, the data processor 73 estimates the output level as a lower output voltage level, where the first signal or the second signal indicates the absence, non-detection or weakness of any observed magnetic field, where the first signal indicates the first axial misalignment of the primary magnet 80 and the first magnetic field sensor 76, or where the second signal indicates the second axial misalignment of the secondary magnet 82 and the secondary magnetic field sensor 78.

In one embodiment, the data processor 73 is programmed or adapted to determine if the observed (or sensed) axial linear position of the rotor 24 is displaced from a rest axial position of the rotor 24 in an operational axial position in the direction of flow of the material. Here, the data processor 73 is adapted to generate a status message indicative of the flow or flow rate of material through the machine if the sensed linear position is in the operational axial position.

In one embodiment, the data processor 73 is powered, at least partially, by the first electromagnetic signal induced in the first stator windings 32. If the machine (211 or 311) or electronic module 57 provides electrical energy to power the sensing system 70 to conserve energy, the data processor 73 may not generate another status message that indicates no flow or the absence of the significant flow of material through the machine. However, in an alternate embodiment, if the sensing system 70 or the data processor 73 generates another status message that indicates no flow or the absence of the significant flow of material through the machine, the sensing system 70 or data processor 73 may have a supplemental energy source (e.g., battery or connection to a voltage bus of a vehicle) besides any electrical energy generated by the machine 211 or 311.

In one configuration, the sensing system 70 or the data processor 73 determines that the rotor (224, 324) is in a certain axial position based on an observed strength of the first magnetic field and the second magnetic field (of the first magnetic field sensor 76 and the second magnetic field sensor 78, respectively). The certain axial position is selected from the group consisting of the rest axial position of the rotor (224 or 324) and the operational axial position of the rotor (224 or 324), where the operational axial position is assigned to a minimum magnetic field strength, a maximum magnetic field strength, a minimum magnetic field strength range, or a maximum magnetic field strength range. The data storage device 72 stores the pre-determined, factory-assigned or established relationship between the certain axial position and the magnetic field strength to facilitate determination of the rest axial position, the operational axial position, or both from observed magnetic field measurements of the sensors (76, 78).

The machine 211 of FIG. 3 may be configured to operate in accordance with various procedures, which may be applied separately and cumulatively.

Under a first procedure, the first magnetic field sensor 76 and the second magnetic field sensor 78 produce a first signal and a second signal, respectively, based on the axial linear position of the rotor (224 or 324) (with respect to the housing 10) versus time. The first magnetic field sensor 76, the second magnetic field sensor 78, individually or collectively, produce a first signal, a second signal, or an aggregate signal from the first signal and the second signal indicative of flow or flow rate of material through the machine. For example, the first signal, the second signal or the aggregate signal may indicate whether or not material is flowing through the machine (211 or 311) and pressing against the rotor (224 or 324), or the rate that the material is flowing through the machine (211 or 311). If material is flowing through the machine 211, the rotor 24 tends to be urged, moved or forced axially to an operational axial position in the direction of the travel of the material from the inlet 20 to the outlet 22. In contrast, if no material is flowing through the machine 211, the rotor 24 tends to be at a rest axial position in which the axial position returns (by gravity or a biasing member (e.g., spring) from the operational axial position) counter to the direction of the travel of the material from the inlet 20 to the outlet 22.

Under a second procedure, the first magnetic field sensor 76 and the second magnetic field sensor 78 produce a first signal and a second signal, respectively, that are indicative of the an output voltage generated across the first stator windings 32. The first magnetic field sensor 76, the second magnetic field sensor 78, individually or collectively, produce a first signal, a second signal, or an aggregate signal from the first signal and the second signal indicative of flow of material through the machine. For example, the first signal, the second signal or the aggregate signal may indicate whether or not material is flowing through the machine (211 or 311) and pressing against the rotor (224 or 324), or the rate that the material is flowing through the machine (211 or 311). If material is flowing through the machine (211 or 311), the rotor (224 or 324) tends to be urged, moved or forced axially to an operational axial position in the direction of the travel of the material from the inlet 20 to the outlet 22. In contrast, if no material is flowing through the machine (211 or 311), the rotor (224 or 324) tends to be at a rest axial position, separated from the operational axial position. In the rest axial position, the axial position of the rotor (224 or 324) returns to an axial point that is spaced apart from the operational axial position counter to the direction of the travel of the material from the inlet 20 to the outlet 22.

Under a third procedure, if the first magnetic field sensor 76 detects a first magnetic field associated with the presence or detection of the primary magnet 80 or axial alignment of the first magnetic field sensor 76 and the primary magnet 80, the first field sensor produces a first signal representative of the presence (e.g., associated with maximum observed magnetic field or maximum observed magnetic field range) or detection of the first magnetic field or the axial alignment. If the second magnetic field sensor 78 detects a second magnetic field associated with the presence (e.g., associated with maximum observed magnetic field or maximum observed magnetic field range) or detection of the secondary magnet 82 or axial alignment of the second magnetic field sensor 78 and the secondary magnet 82, the second field sensor produces a second signal representative of the second magnetic field or the axial alignment. The data processor 73 uses the observed presence (e.g., detection) or absence (e.g., non-detection) of the first magnetic field, the second magnetic field, or both to determine whether the rotor (224 or 324) is in a first axial position (e.g., rest axial position) or in a second axial position (e.g., operational axial position), spaced apart from the first axial position. If the data processor 73 determines that the rotor (224 or 324) is in the second axial position (e.g., operational axial position), the data processor 73 may provide a status message or a signal that indicates that the rotor (224 or 324) is active or material is flowing through the machine (211 or 311).

Under a fourth procedure, if the first magnetic field sensor 76 detects a first magnetic field associated with the absence or non-detection of the primary magnet 80 or axial misalignment of the first magnetic field sensor 76 and the primary magnet 80, the first field sensor produces a first signal representative of the absence (e.g., associated with a minimum observed magnetic field or minimum observed magnetic field range) or non-detection of the first magnetic field or the axial misalignment. If the second magnetic field sensor 78 detects a second magnetic field associated with the absence (e.g., associated with minimum observed magnetic field or minimum observed magnetic field range) or non-detection of the secondary magnet 82 or axial misalignment of the second magnetic field sensor 78 and the secondary magnet 82, the second magnetic field sensor 78 produces a second signal representative of the second magnetic field or the axial misalignment. The data processor 73 uses the observed presence (e.g., detection) or absence (e.g., non-detection) of the first magnetic field, the second magnetic field, or both to determine whether the rotor 24 is in a first axial position (e.g., rest axial position) or in a second axial position (e.g., operational axial position), spaced apart from the first axial position. If the data processor 73 determines that the rotor 24 is in the second axial position, the data processor 73 may provide a status message or a signal that indicates that the rotor 24 is active or material is flowing through the machine (211 or 311).

Under a fifth procedure, the digitized first signal and the digitized second signal may be inputted to an AND gate or another Boolean logic circuit to produce a first output state (e.g., high logic level) indicative of peak generated output energy (e.g., maximum generated voltage) and an axial alignment of the primary magnet 80 and secondary magnet 82 with the first magnetic field sensor 76 and the second magnetic field sensor 78, respectively; a second output state (e.g., low logic level) indicative of lower generated output energy and axial misalignment of the primary magnet 80 and secondary magnet 82 with the first magnetic field sensor 76 and the second magnetic field sensor 78, respectively.

Figure 4:
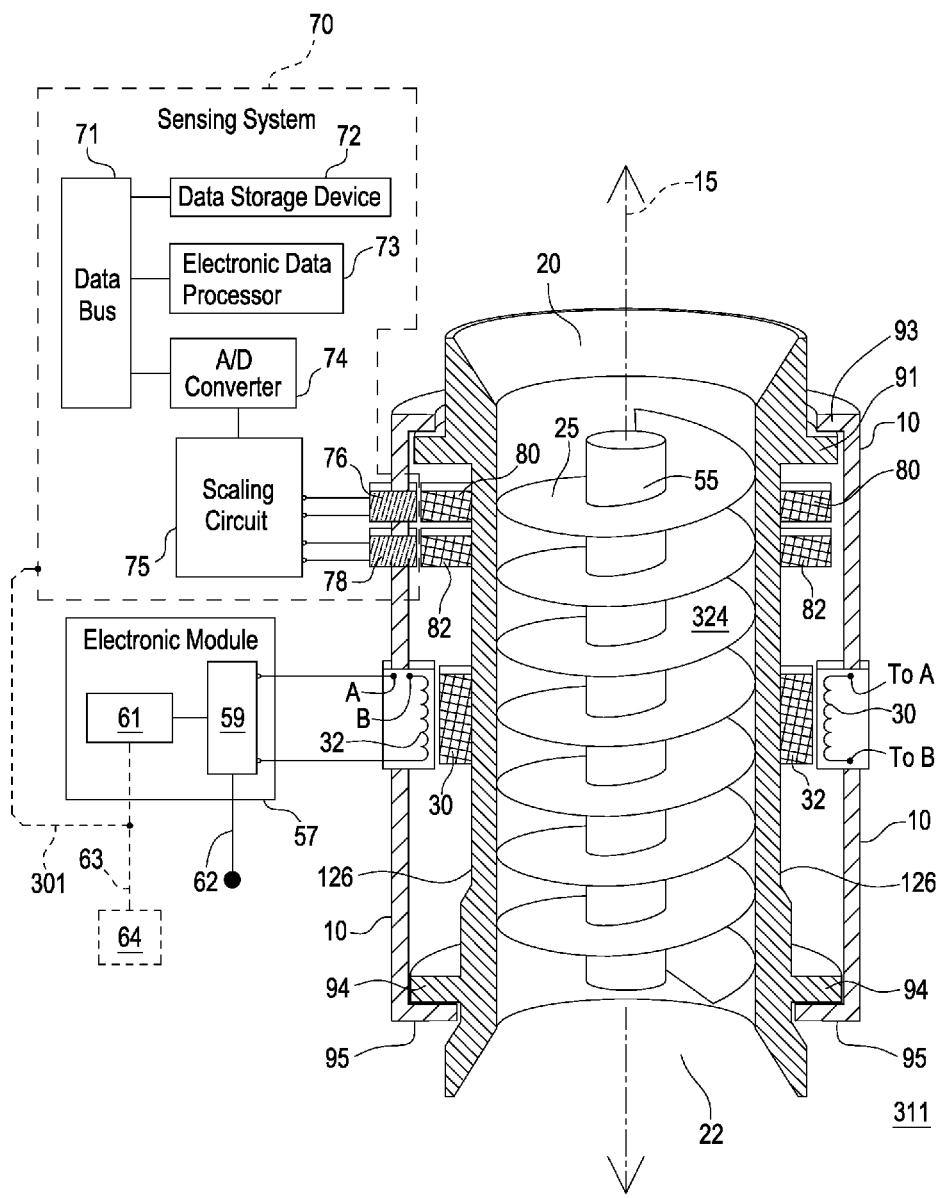
FIG. 4 is a cross section of a four embodiment of a machine for generating electrical energy or sensing material flow in accordance with the disclosure.

The machine 11 of FIG. 4 is similar to the machine 211 of FIG. 3, except the rotor 324 of FIG. 4 has a central cylindrical member 55 aligned with the central rotational axis 15 of the rotor 324. Like reference numbers in FIG. 3 and FIG. 4 indicate like elements. In one configuration, the central cylindrical member 55 can add additional support or rigidity to the blades 25. In another configuration, central cylindrical member 55 can prevent some material from flowing unimpeded through a central region of the rotor 324 without pressing against the rotor blades 25 to impress or affect rotational movement of the rotor 324.

Figure 5:
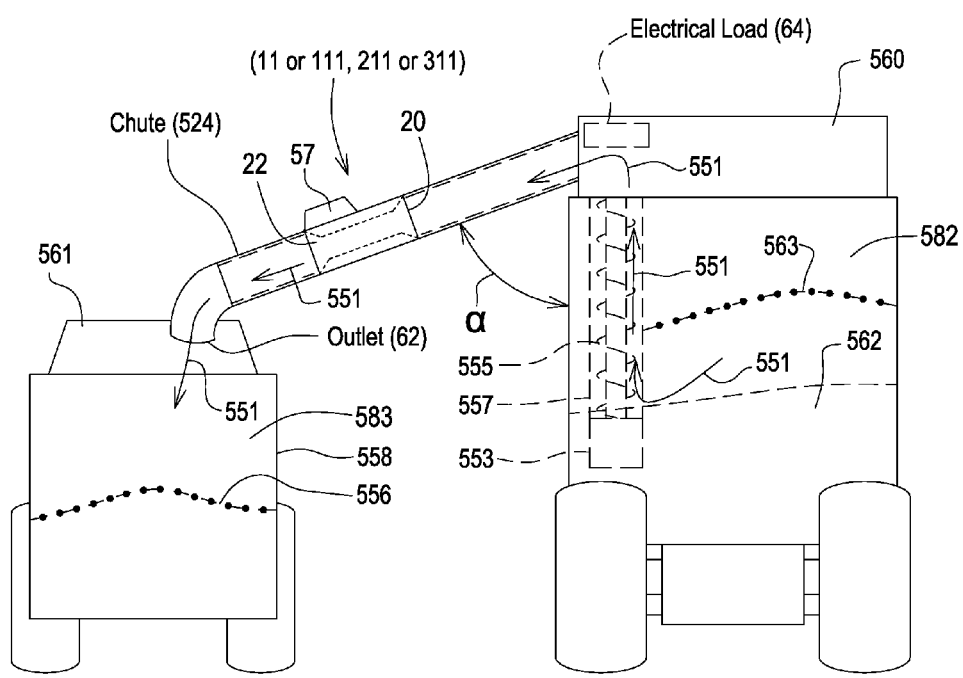
FIG. 5 shows the machine for generating electrical energy installed on the chute of a combine or harvester.

In FIG. 5, a combine 560 or harvester harvests a crop, plant or other material. As best illustrated in FIG. 5, machine (11, 111, 211 or 311) or housing 10 has an inlet 20 and an outlet 22 for attachment to the chute 524, where arrow 551 illustrates the direction of flow of the material through the chute 524. The combine 560 or harvester transfers the harvested material from the combine 560 or harvester to a receiving vehicle 561, such as a cart (e.g., grain cart), via the chute 524. In one embodiment, the combine 560 or harvester has an auger 555 for conveying material 563 from a bin 582 (e.g., grain tank) with sloped floor 562 to the receiving vehicle 561 via the chute 524. In the combine 560, the material height 563 or cross-sectional profile of the material is illustrated by the alternating dotted-and-dashed line. For example, the harvested material comprises an agricultural material selected from the group consisting of corn, grain, soybeans, oilseed, wheat, barley, oats, rice, cotton, fiber, stover, forage or other plant material. A propulsion unit 553 is capable of rotating the auger 555 to convey the material from the bin 582 in the direction shown by the arrows 551. The auger 555 is mounted in and can rotate with respect to channel 557. As shown the chute 524 makes an angle α with respect to a vertical axis 567 or the side of the combine 560. The combine 560 or harvester and the grain cart 583 may have wheels, such that the combine 60 or harvester may both harvest and transfer harvested material to the receiving vehicle 561 while both the combine 560 (or harvester) and the receiving vehicle 561 are moving along similar coordinated or parallel paths in substantially the same direction of travel. In the interior 583 of the cart 558, the material height 556 or cross-sectional profile of the material is illustrated by the alternating dotted-and-dashed line.

In alternate embodiments, the machine 11 (e.g., 11) may be embodied as a combination of any independent claim and one or more features of any dependent claim thereon, where any features from one or more dependent claims may be incorporated cumulatively or separately into any independent claim upon which the dependent claims or its features depend or are otherwise supported by the disclosure.

Having described the preferred embodiment, it will become apparent that various modifications can be made without departing from the scope of the invention as defined in the accompanying claims.

The following is claimed:

1. A machine for generating electrical energy, the machine comprising:
   a housing;
   a rotor with interior blades, arranged in a substantially spiral or helical pattern about a central rotational axis with an open central region, for rotation in response to receipt of harvested material at or in a inlet, the rotor having an outer surface, the open central region without any central cylindrical member to support the interior blades;

a first magnet assembly secured to the outer surface of the rotor; and a first stator winding in electromagnetic communication with the corresponding first magnetic assembly, such that if the rotor rotates a first electromagnetic signal energizes the first stator windings based on the flow of material through and about the inlet.

2. The machine according to claim 1 further comprising:
a rectifier coupled to the first stator windings for converting the electromagnetic signal into a direct current signal; and
an energy storage device for storing the direct current signal.

3. The machine according to claim 2 wherein the direct current signal has a voltage or current that is indicative of a rate of flow of material through the inlet.

4. The machine according to claim 1 further comprising:
a second stator winding in electromagnetic communication with the corresponding second magnetic assembly, such that if the rotor rotates a second electromagnetic signal energizes the second stator windings based on the flow of material through and about the inlet.

5. The machine according to claim 1 further comprising:
a third stator winding in electromagnetic communication with the corresponding third magnetic assembly, such that if the rotor rotates a third electromagnetic signal energizes the third stator windings based on the flow of material through and about the inlet.

6. The machine according to claim 1 wherein the interior blades are arranged in a spiral about a central rotational axis.

7. The machine according to claim 1 wherein the interior blades are arranged as an auger with a central cylindrical member.

8. The machine according to claim 1 wherein the inlet is coupled or connected to a chute of a harvester or combine.

9. The machine according to claim 8 wherein the material comprises an agricultural material selected from the group consisting of corn, grain, soybeans, oilseed, wheat, and barley.

10. The machine according to claim 1 wherein a plurality of axial bearings support the rotor in the housing for rotation of the rotor with respect to the housing.

11. The machine according to claim 1 further comprising:
a primary magnet secured to the outer surface of the rotor;
a secondary magnet secured to the outer surface of the rotor and axially spaced apart from the primary magnet;
a first magnetic field sensor for sensing a linear position versus time of the rotor by detection or non-detection of a first magnetic field associated with the primary magnet; and
a second magnetic field sensor for sensing the linear position versus time of the rotor by detection or non-detection of a second magnetic field associated with the secondary magnet.

12. The machine according to claim 11 wherein the first magnetic field sensor and the second magnetic field sensor are powered by the first electromagnetic signal induced in the first stator windings.

13. The machine according to claim 11 further comprising:
a data processor for determining if the sensed linear position is displaced from a rest axial position of the rotor in an operational axial position in the direction of flow of the material; the data processor adapted to generate a status message indicative of the flow of material through the machine if the sensed linear position is in the operational axial position.

14. The machine according to claim 13 wherein the data processor is powered, at least partially, by the first electromagnetic signal induced in the first stator windings.

15. The machine according to claim 13 wherein the data processor determines that the rotor is in a certain axial position based on an observed strength of the first magnetic field and the second magnetic field, the certain axial position selected from the group consisting of the rest axial position of the rotor and the operational axial position of the rotor, where the operational axial position is assigned to a minimum magnetic field strength range or a maximum magnetic field strength range.

16. A harvester for harvesting an agricultural material, the harvester comprising:
a chute for unloading or transferring agricultural material from the harvester;
an electrical energy generator associated with the chute, wherein the electrical energy generator comprises:
a housing;
a rotor with interior blades, arranged in a substantially spiral or helical pattern about a central rotational axis with an open central region, for rotation in response to receipt of harvested material from a chute, the rotor having an outer surface, the open central region without any central cylindrical member to support the interior blades;
a first magnet assembly secured to the outer surface of the rotor; and
a first stator winding in electromagnetic communication with the corresponding first magnetic assembly, such that if the rotor rotates a first electromagnetic signal energizes the first stator windings based on the flow of material through and about an inlet.

17. The harvester according to claim 16 further comprising:
a rectifier coupled to the first stator windings for converting the electromagnetic signal into a direct current signal; and
an energy storage device for storing the direct current signal.

18. The harvester according to claim 17 wherein the direct current signal has a voltage or current that is indicative of a rate of flow of material through the inlet.

19. The harvester according to claim 16 further comprising:
a second stator winding in electromagnetic communication with the corresponding second magnetic assembly, such that if the rotor rotates a second electromagnetic signal energizes the second stator windings based on the flow of material through and about the inlet.

20. The harvester according to claim 16 further comprising:
a third stator winding in electromagnetic communication with the corresponding third magnetic assembly, such that if the rotor rotates a third electromagnetic signal energizes the third stator windings based on the flow of material through and about the inlet.

21. The harvester according to claim 16 wherein the interior blades are arranged in a spiral about a central rotational axis.

22. The harvester according to claim 16 wherein the interior blades are arranged as an auger with a central cylindrical member.

23. The harvester according to claim 16 wherein the inlet is mechanically coupled or operably connected to the chute of a harvester or combine.

24. The harvester according to claim 16 wherein the material comprises an agricultural material selected from the group consisting of corn, grain, soybeans, oilseed, wheat, and barley.

25. The harvester according to claim 16 wherein a plurality of axial bearings support the rotor in the housing for rotation of the rotor with respect to the housing.

26. The harvester according to claim 16 further comprising:
- a primary magnet secured to the outer surface of the rotor;
- a secondary magnetic secured to the outer surface of the rotor and axially spaced apart from the primary a magnet;
- a first magnetic field sensor for sensing a linear position versus time of the rotor by detection or non-detection of a first magnetic field associated with the primary magnet; and
- a second magnetic field sensor for sensing the linear position versus time of the rotor by detection or non-detection of a second magnetic field associated with the secondary magnet.

27. The harvester according to claim 16 wherein the first magnetic field sensor and the second magnetic field sensor are powered by the first electromagnetic signal induced in the first stator windings.

28. The machine according to claim 16 further comprising:
- a data processor for determining if the sensed linear position is displaced from a rest axial position of the rotor in an operational axial position in the direction of flow of the material; the data processor adapted to generate a status message indicative of the flow of material through the machine if the sensed linear position is in the operational axial position.

29. The machine according to claim 28 wherein the data processor is powered, at least partially, by the first electromagnetic signal induced in the first stator windings.

30. The machine according to claim 28 wherein the data processor determines that the rotor is in a certain axial position based on an observed strength of the first magnetic field and the second magnetic field, the certain axial position selected from the group consisting of the rest axial position of the rotor and the operational axial position of the rotor, where the operational axial position is assigned to a minimum magnetic field strength range or a maximum magnetic field strength range.

31. A machine for generating electrical energy, the machine comprising:
- a housing;
- a rotor with interior blades, arranged in a substantially spiral or helical pattern about a central rotational axis, for rotation in response to receipt of material at or in a inlet, the rotor having an outer surface;
- a first magnet assembly secured to the outer surface of the rotor; and
- a first stator winding in electromagnetic communication with the corresponding first magnetic assembly, such that if the rotor rotates a first electromagnetic signal energizes the first stator windings based on the flow of material through and about the inlet, the first magnet assembly and the first stator winding radially spaced apart from each other.

\* \* \* \* \*